(No Model.)

W. LEGGETT.
TIRE FOR WHEELS.

No. 422,349. Patented Feb. 25, 1890.

Witnesses:
John Buckles,
C. H. Washburn,

Inventor
Wm Leggett.
By A. M. Pierce
Atty

N. PETERS, Photo-Lithographer, Washington, D. C.

UNITED STATES PATENT OFFICE.

WILLIAM LEGGETT, OF PASSAIC, NEW JERSEY, ASSIGNOR TO E. FRANCIS ELDREDGE, OF NEW YORK, N. Y.

TIRE FOR WHEELS.

SPECIFICATION forming part of Letters Patent No. 422,349, dated February 25, 1890.

Application filed July 6, 1889. Serial No. 316,676. (No model.)

*To all whom it may concern:*

Be it known that I, WILLIAM LEGGETT, a citizen of the United States, and a resident of Passaic, in the county of Passaic and State of New Jersey, have invented certain new and useful Improvements in Rubber Tires, of which the following is a specification.

My invention relates especially to devices employed upon the wheels of carriages, buggies, &c., to deaden the noise produced in driving over hard or rough surfaces and to contribute to the ease of the motion of the vehicle.

To attain the desired end, my invention consists, essentially, in a tire made of india-rubber or equivalent material, said tire having in its center a steel core perforated for the reception of bolts or screws for securing the rubber tire to a metal tire concave upon its outer face and flat upon its interior, for the purpose of firmly holding the tire and at the same time permitting my improvement to be applied to any style of existing wheel; and my invention also involves certain other novel and useful combinations or arrangements of parts and peculiarities of construction and operation, all of which will be hereinafter first fully described, and then pointed out in the claims.

Figure 1:
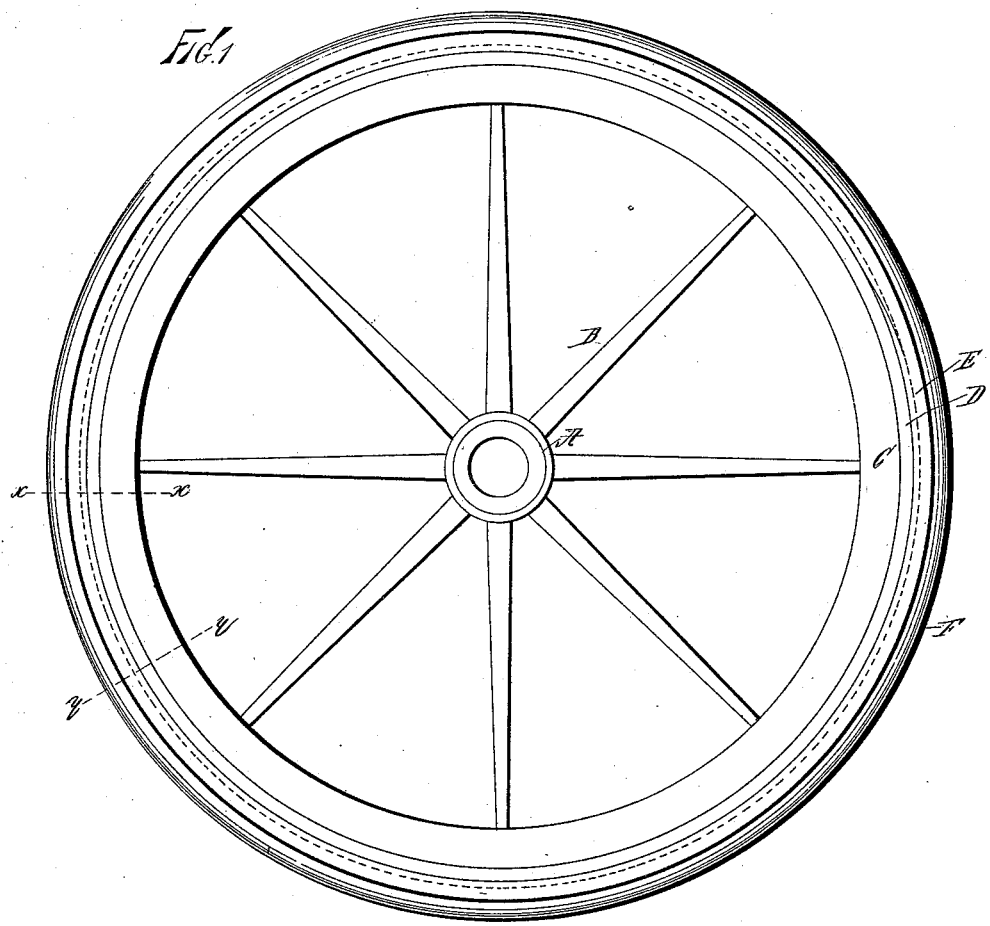
Figure 2:
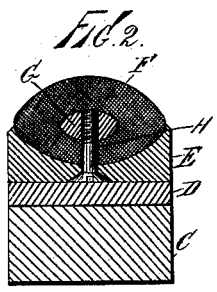
Figure 3:
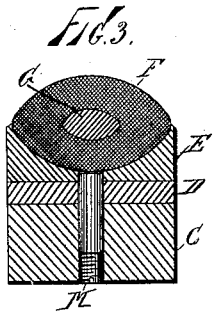

In the drawings, Figure 1 is a plan view of a vehicle-wheel wherewith my improvement is employed. Fig. 2 is a cross-sectional view at line *x x* of Fig. 1. Fig. 3 is a cross-sectional view illustrating a method of securing the tire to the wheel; and Fig. 4 is a cross-sectional view at line *y y*, illustrating a hidden method of securing the tire to the wheel.

Like letters of reference indicate corresponding parts in all the figures.

A is the hub of the wheel, and B the spokes. C are the fellies. D is the ordinary iron or steel tire.

Figure 4:
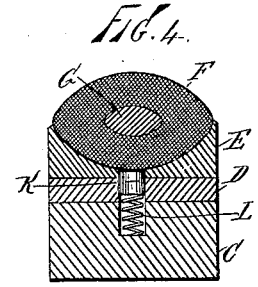

E is a tire of steel having its inner face flat and its outer face concave, as particularly illustrated in Figs. 2, 3, and 4.

F is a rubber tire, preferably ovoid in form and containing a steel core G, having screw-threaded perforations therein at short intervals for the reception of screws or bolts H, which pass through the steel tire E. By this construction the rubber is rigidly held against possibility of stretching, and cannot become loose, and the steel tire E holding the rubber against any lateral or side movement.

In applying my improved tire to the ordinary wheel, if the tire D is rounded upon its edges through wear, the wheel may be placed in a lathe and trued up upon its face and holes bored through the tire and fellies at intervals around the wheel. The proper size of steel tire E, bearing its rubber face F, is then passed thereover, and if it is desired to permanently secure my rubber tire in place springs L are inserted in each perforation and pins K thereover. Thus when the tire is slipped into place the pins K will be forced into the perforations in the tire E, holding the same in place. When desired, the perforations may be made to pass entirely through the fellies and screws M used, as illustrated in Fig. 3.

Having now fully described my invention, what I claim as new therein, and desire to secure by Letters Patent, is—

1. The combination, with a vehicle-wheel provided with a metal tire, of a solid metal tire and a rubber tire ovoid in cross-section and provided with a continuous central metal core perforated for the reception of fastening bolts or screws, by which it is secured to the solid metal tire, said metal tire being concave upon its outer face and flat within, and having its edges at right angles to its inner face and upon the same plane as the tire of the vehicle-wheel, substantially as shown and described.

2. The combination, with a rubber tire constructed and arranged as set forth and having perforations in the metal tire to which the rubber is secured, of holding concealed devices within the fellies of the wheel adapted to enter said perforations, substantially as shown and described.

3. A rubber tire having a core of metal, a metal tire to which said rubber is secured, said metal tire being perforated, as set forth, the fellies of a wheel having perforations which coincide with the perforations in the metal tire, and spring-actuated radial pins located in said perforations, the whole combined and arranged substantially as shown and described.

Signed at New York, in the county of New York and State of New York, this 27th day of June, A. D. 1889.

WILLIAM LEGGETT.

Witnesses:
A. M. PIERCE,
C. H. WASHBURN.